Patented June 16, 1931

1,810,261

UNITED STATES PATENT OFFICE

WILLARD L. VOGEL, OF LOS ANGELES, CALIFORNIA, ASSIGNOR OF ONE-TENTH TO PAUL W. PRUTZMAN

QUINOLIN-BENZOIC-CARBOXYLIC ACID

No Drawing.   Application filed May 22, 1928.   Serial No. 279,853.

To produce my new chemical compound I proceed in the following manner. I take one molecule or 249 parts by weight of phenyl-cinchoninic acid (2-phenyl-quinolin-4-carboxylic acid—known commercially as "Cincophen" and as "Atophan") and one molecule or 160 parts by weight of sodium salicylate, and dissolve in 100 molecules or 3200 parts by weight of methyl alcohol or an equal volume of ethyl alcohol. The alcohol should be pure and substantially dry. It acts as a solvent only, taking no part in the reaction, and a greater or a somewhat less quantity may be used, though I prefer to use the proportion stated.

To bring these bodies into solution I heat the mixture to not over 70° C. and preferably to about 60° C. The alcohol boils and the solid materials form with the alcohol a clear brown solution. This operation must be conducted in a glass, porcelain or enamel lined vessel.

I then allow the vessel and its contents to cool to atmospheric temperature (15° to 20° C.) and to stand at such temperature for say twenty four hours. During this time a crop of crystals separates from the solution. The byproduct, consisting mainly of sodium phenolate, remains in solution in the mother liquor. I filter off these crystals, wash them with cold alcohol until no further decolorization is produced thereby, and dry the washed crystals in porcelain or enamel trays in an oven, at a temperature not exceeding 75° C.

The product of the above process is a whitish, crystalline substance having a molecular weight of 293. Chemically it is quinolin-2-benzoic-4-carboxylic acid, having the empirical formula $C_{17} H_{11} O_4 N$. Its structural formula I believe to be

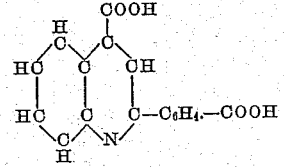

This product is suitable for use as a material in the manufacture of a certain quinolin-2-acetylsalicylic-4-carboxylic acid described in a companion application filed May 22, 1928 under Serial No. 279,852, and I believe it to be a suitable raw material for the synthesis of other substances of value.

I claim as my invention:

1. A method of manufacturing quinolin-2-benzoic-4-carboxylic acid, which comprises: dissolving with heat in a monohydric alcohol unimolecular proportions of 2-phenyl-quinolin-4-carboxylic acid and sodium salicylate; cooling the solution to crystallize a reaction product so formed, separating the crystals from the solution; washing the crystals with alcohol, and drying the crystals.

2. A method of manufacturing quinolin-2-benzoic-4-carboxylic acid, which comprises: combining in alcoholic solution unimolecular proportions of 2-phenyl-quinolin-4-carboxylic acid and sodium salicylate; heating to produce reaction, and separating the reaction product from the solution.

In witness that I claim the foregoing I have hereunto subscribed my name this 15th day of May, 1928.

WILLARD L. VOGEL.